United States Patent [19] [11] 4,123,632
Muto [45] Oct. 31, 1978

[54] TURN SIGNAL MECHANISM FOR USE IN MOTOR VEHICLES

[75] Inventor: Toshiya Muto, Nagoya, Japan

[73] Assignee: Kabushiki Kaisha Tokai Rika Denki Seisakusho, Aichi, Japan

[21] Appl. No.: 735,965

[22] Filed: Oct. 27, 1976

[30] Foreign Application Priority Data

Oct. 27, 1975 [JP] Japan .................... 50-146287[U]

[51] Int. Cl.² .............................................. H01H 3/16
[52] U.S. Cl. ................................ 200/61.27; 200/61.3; 200/61.34
[58] Field of Search ................ 200/61.27, 61.3, 61.34, 200/61.35, 61.54

[56] References Cited

U.S. PATENT DOCUMENTS

| Re. 26,648 | 8/1969 | Stoi et al. | 200/61.34 |
| 3,180,177 | 4/1965 | Ford et al. | 200/61.34 X |
| 3,372,252 | 3/1968 | Stoi et al. | 200/61.34 |
| 3,459,909 | 8/1969 | Winogrocki et al. | 200/61.34 |
| 3,604,975 | 9/1971 | Suzuki et al. | 200/61.27 X |
| 3,699,286 | 10/1972 | Suzuki et al. | 200/61.34 |
| 3,710,049 | 1/1973 | Burgess et al. | 200/61.27 |
| 3,914,566 | 10/1975 | Wendling | 200/61.27 |

Primary Examiner—James R. Scott
Attorney, Agent, or Firm—Koda and Androlia

[57] ABSTRACT

A turn signal indicating mechanism for use in motor vehicles comprising a housing, a movable bracket movable to right, left and neutral positions provided in the housing, an operating lever pivotally coupled to the movable bracket which is pivotable back and forth from a neutral position and a turn signal switch actuated the pivotable operating lever whereby turn signals for a lane change are generated by pivoting the operating lever without moving the movable bracket and turn signal for a left or right turn are generated by pivoting the operating lever until the movable bracket is moved to either the right or left turn position.

4 Claims, 7 Drawing Figures

TURN SIGNAL MECHANISM FOR USE IN MOTOR VEHICLES

BACKGROUND OF THE INVENTION

1. Field of the Invention

This invention relates to turn signal indicating means for motor vehicles and more particularly, to turn signal actuating mechanisms for motor vehicles.

2. Prior Art

With the advent of the legal acceptance and use of electrical devices for indicating left and right turns and lane changes has come several difficulties. One of such difficulties is associated with the fact that the mechanism which is operated by the driver of the motor vehicle is designed such that it automatically returns to the neutral position at the completion of a left or right turn. Since the mechanism is designed to only return to the neutral position upon the completion of a right or left turn, frequently when the electric turn signals are used to indicate a lane change, they are forgotten in the on condition. In an attempt to overcome this problem of the turn signals remaining in the on condition when a lane change is signaled, devices have been added in the prior art which make a noise and/or flash a light to indicate that the turn signals are actuated. Such prior art devices distract the operator's attention and frequently are ineffectual.

SUMMARY OF THE INVENTION

Accordingly, it is a general object of the present invention to provide a turn signal mechanism which overcomes the difficulties of the prior art.

In keeping with the principles of the present invention, the objects are accomplished by a unique turn signal indicating mechanism for use in motor vehicles comprising a housing, a movable bracket which is movable to left, right and neutral positions provided in the housing, a means for holding the movable brackets in the neutral, left and right positions, an operating lever pivotally coupled to the movable bracket which is pivotable back and forth from a neutral position and a turn signal which activated by the pivotable operating lever whereby turn signals for a lane change are generated by pivoting the operating lever without moving the movable bracket and turn signals for a left or right turn are generated by pivoting the operating lever until the movable bracket is moved either to the right or left turn positions.

BRIEF DESCRIPTION OF THE DRAWINGS

The above mentioned and other features and objects of the present invention will become more apparent by reference to the following description taken in conjunction with the accompanying drawings, wherein like reference numerals denote like elements, and in which.

DESCRIPTION OF THE INVENTION

Figure 1:
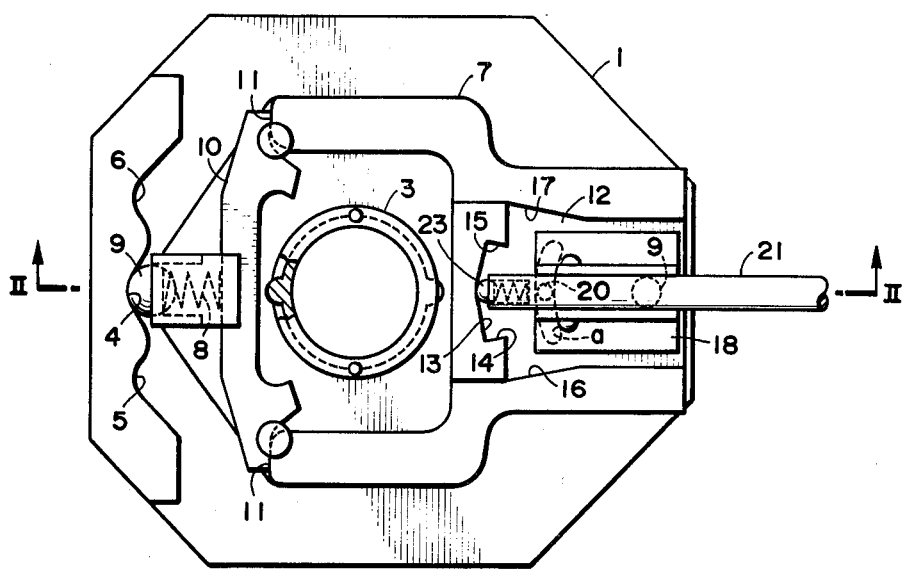
FIG. 1 is a plan view of a turn signal indicating mechanism in accordance with the teachings of the present invention.
Figure 2:
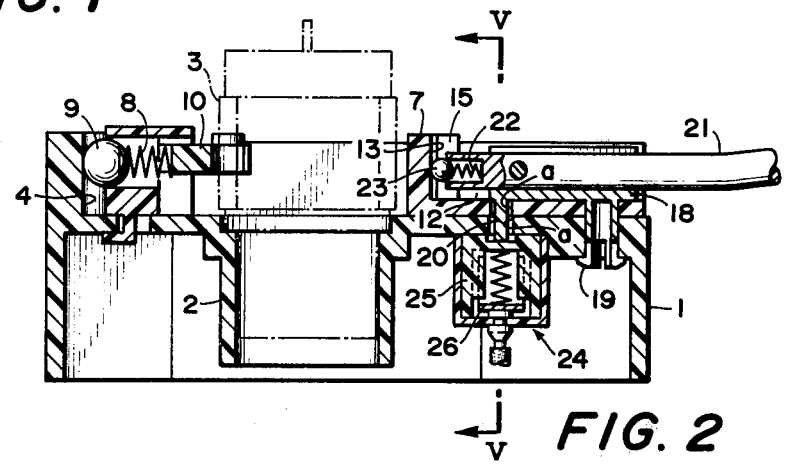
FIG. 2 is a cross-sectional view of the embodiment of FIG. 1 along the lines II—II.

Referring to the figures, FIG. 1 is a plan view of a turn signal mechanism in accordance with the teachings of the present invention. The turn signal mechanism includes a housing 1 which is secured to the dash of the motor vehicle so that it does not rotate with the steering shaft which is inserted into the central tube 2. Cancelling cam 3 is freely rotatably coupled to the inside of tube 2 and is provided so that it rotates integrally with a steering wheel and steering shaft inserted through central tube 2.

A channel 12 is provided in one side of a movable bracket 7 which is provided within housing 1. A swinging plate 18 to which an operating lever 21 is attached is provided in channel 12. A pivot pin 19, which projects from the bottom of swinging plate 18, passes through movable bracket 7 and is inserted into a hole in body 1 thereby rotatably coupling the swinging plate to the housing 1. Furthermore, movable bracket 7 pivots on pivot pin 19. Detents 4, 5 and 6 are provided in housing 1 and hold movable bracket 7 in a neutral position and at angles which correspond to the left and right turn signal positions.

A spring-loaded roller 9 which is biased outwardly by a spring 8 is provided on the end of movable bracket 7 such that it engages with detents 4, 5 and 6, one at a time. The roller 9 and the detents 4, 5 and 6 form a well known retaining mechanism which holds the movable bracket 7 in a neutral position and in left and right turn signal positions. Well known cancelling paw 10 is coupled to movable bracket 7 by stoppers 11 and is driven in the cancelling direction by cancelling cam 3.

A shallow V-shaped sliding surface 13 is provided at the interior end of channel 12 of movable bracket 7. Identical stopping surfaces 14 and 15 are provided at each end of sliding surface 13 facing each other. A switch actuating stud 20 is provided on the bottom surface of swinging plate 18 and extends through an arc-shaped slot "a" provided in the bottom of channel 12 and in housing 1. Actuating stud 20 is coupled to a movable contact holder 25 of the turn signal switch 24. A spring-loaded roller 23 which is biased outwardly by spring 22 such that it contacts the center of the sliding surface 13, is provided in the inner end of operating lever 21.

Figure 3:
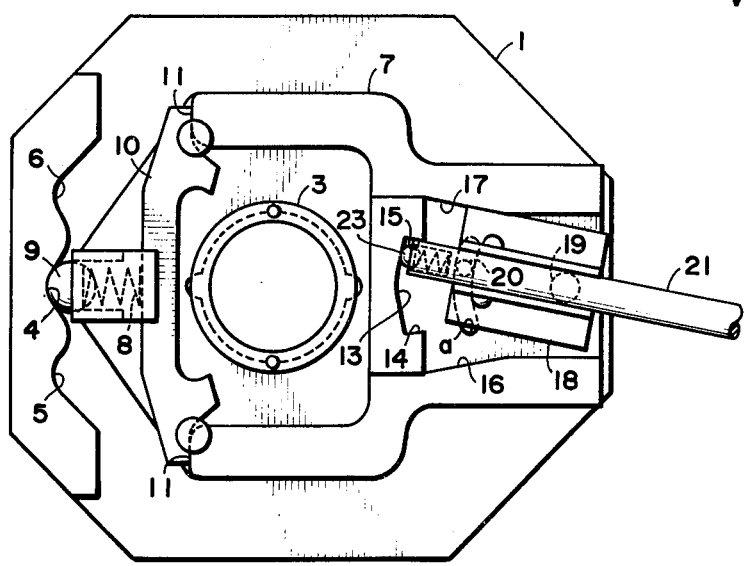
FIG. 3 is a plan view which illustrates the operation of the embodiment of FIG. 1.

Operating lever 21, together with the force applied by spring 8, is designed such that it can be pivoted back and forth without moving the movable bracket 7 when a force is applied which is not sufficient to offset the engaging force of the spring-loaded roller 9 against detent 4 from the neutral position shown in FIG. 1, and engages with the appropriate stopping surface 14 or 15 as illustrated in FIG. 3. From the description, it should be apparent that the angle of swing from a neutral position permitted is fixed. Furthermore, when the lever 21 is pivoted from the neutral position, loaded roller 23 rolls across the incline surface of sliding surface 13 and compresses spring 22. Therefore, when operating lever 21 is released, it is automatically returned to the neutral position by the force stored in spring 22. The V-shaped sliding surface 13 and the spring-loaded roller 23 constitute one example of an automatic return mechanism for the operating lever 21 of this invention.

Figure 5:
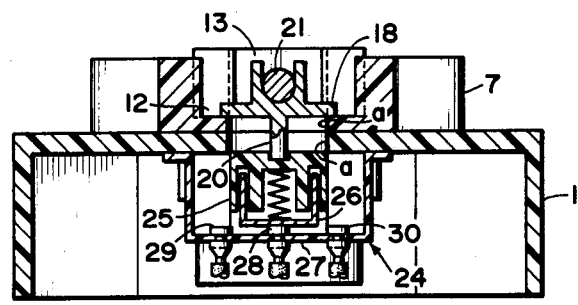
FIG. 5 is a cross-sectional view of the embodiment of FIG. 1 along the lines V—V in FIG. 2.

As shown in FIG. 5, the power source terminal contact 28 and the load terminal contacts 29 and 30 which are connected to the turn signal lamps, are installed on an insulating plate 27 in the turn signal switch 24. A movable contact holder 26 is coupled to a movable contact holder 25 is coupled to stud 20. Movable contact 26 is arranged and configured such that it makes contact with source contact 28 and one of the load terminal contacts 29 or 30 when the operating lever 21 is caused to pivot through or nearly through the permitted angle when it contacts one of the stopping surfaces 14 or 15.

In addition, retreating surfaces 16 and 17 are provided in both sidewalls of channel 12 in order to permit pivoting motion of the swinging plate 18 caused by movement of the operating lever 21. These retreating surfaces 16 and 17 have a similar function to that of the stopping surfaces 14 and 15.

In operation, the movable bracket 7 is normally held in a neutral position by the engagement of the spring-loaded roller 9 with the detent 4 and the operating lever 21 is normally held in a neutral position by the engagement of the spring-loaded roller 13 with the center of sliding surface 13, as shown in FIG. 1.

Figure 6:
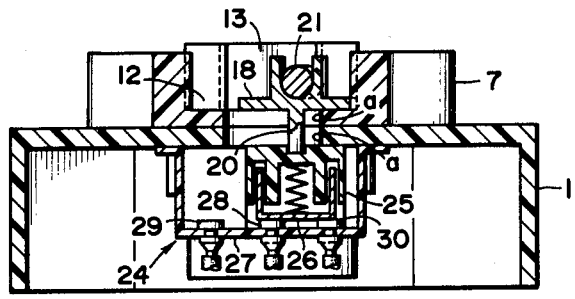
FIG. 6 is a cross-sectional view of the embodiment of FIG. 1 looking along the lines V—V in FIG. 2.

When as shown in FIG. 3, the operating lever 21 is caused to pivot together with the swinging plate 18 so that the side of the inner tip of operating lever 21 contacts the stopping surface 15, this contact will transmit a mechanical shock to the person operating the operating lever 21 due to the fact that the movable bracket 7 is prevented from pivoting by the spring-loaded roller 9. Accordingly, if the pivotal motion of the operating lever 21 is terminated at the point at which this mechanical shock is felt, the movable contact holder 25 will at that time have been moved by the switch-actuating stud 20 of the swinging plate 18 so that the movable contact 26 is in contact with the power source terminal 28 and one load terminal contact 30 (as shown in FIG. 6), thereby causing one of the turn signal lamps to flash. Furthermore, if the operating lever is then released, the lever 21 and the swinging plate 18 are automatically returned to the neutral position by the force stored in spring 22 and the flashing of the turn signal lamp is cancelled. The above operation is used for the generation of signals which indicate a lane change and has no effect upon the movable bracket 7.

Figure 4:
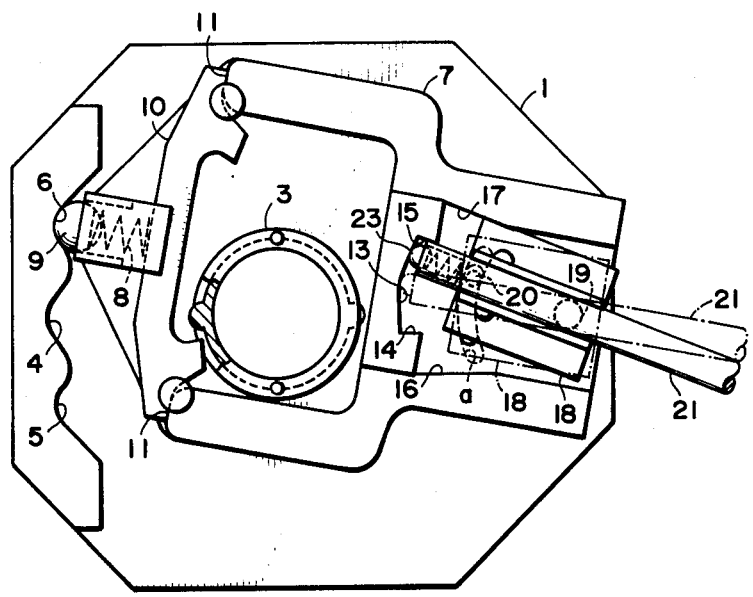
FIG. 4 is a plan view illustrating the operation of the embodiment of FIG. 1.
Figure 7:
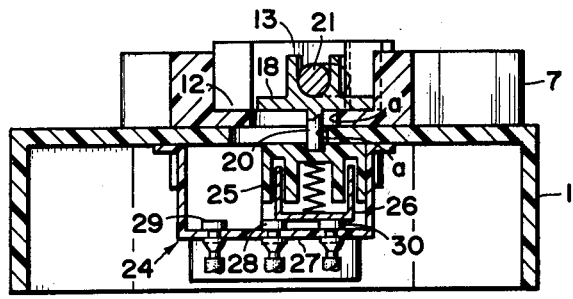
FIG. 7 is a cross-sectional view of the embodiment of FIG. 1 looking along the lines V—V in FIG. 2.

If, on the other hand, when the mechanical shock is felt, the operating lever is continued to be pushed in the same direction, the movable bracket 7 is pushed so that it swings into a turn signal position (as shown in FIG. 4) and the spring-loaded roller 9 engages the detent 6 so that the bracket 7 is held at an angle corresponding to a turn signal position. Accordingly, although the operating lever 21 and the swinging plate 18 will return to a neutral position if the lever is released at this time, the movable bracket 7 is still at an angle established by the movement of the lever 21. Therefore, although the turn signal switch 21 will temporarily assume the aspects shown in FIG. 7, it will afterwards assume much the same position as it did when the operating lever 21 was caused to swing as shown in FIG. 3 (see FIG. 6) so that the movable contact 26 makes contact with the terminals 28 and 30 thereby generating a turn signal by causing one turn signal lamp to flash.

When the steering shaft is allowed to rotate back to the neutral position, the movable bracket 7 will be returned to the neutral position in a conventional manner by the engagement of the cancelling cam 3 with the cancelling paw 10.

From the foregoing description of the design and operation, it should be apparent that the operating lever 21 can be caused to pivot relative to the housing 1 in such a way as to cause two different modes of operation of the turn signal system by pivoting the operating lever 21 through two different angles. Pivoting the operating lever 21 through the first angle causes no accompanying motion of the movable bracket 7 and therefore can be used to signal a lane change while swinging the operating lever 21 through an angle which is greater than the first angle causes the movable bracket 7 to rotate to either the right or left turn positions to indicate a right or left turn. In addition, the movable bracket 7, which in the prior art has been the part which actuates the turn signal, is in this invention converted into a part which either holds the operating lever 21, which is provided within the movable bracket 7 such that it automatically returns to a neutral position relative to the movable bracket by an automatic return device, in a turn signal position or returns it to the original neutral position by means of a well known conventional cancelling mechanism. Since the design of the turn signal mechanism has been improved by making the operating lever 21 the switch-actuating part instead of the movable bracket 7, there is no danger of the movable bracket 7 rotating so that the cancelling paw 10 is projected into the radius of rotation in the cancelling cam and engaged by the cam during the generation of the lane change signal. As was described above, a turn signal indicating mechanism in accordance with the teachings of the present invention therefore possesses the advantage of allowing easy, accurate and separate employment by means of one operating lever of the flashing turn signals to indicate a lane change or an abrupt change in direction of travel of the motor vehicle, such as a right or left turn.

In all cases it is understood that the above described embodiment is merely illustrative of but one of the many possible specific embodiments which can represent the applications of the principles of the present invention. It should be readily apparent to one skilled in the art that numerous and other variations can be devised without departing from the spirit and scope of the invention.

I claim:

1. A turn signal indicating mechanism comprising:
   a housing;
   a movable bracket movable to right and left turn and neutral positions provided in said housing;
   an operating lever pivotally coupled to said movable bracket which is pivotable from a neutral position relative to said movable bracket to right and left lane change positions, said operating lever further causing said movable bracket to move to said right and left turn positions when said operating lever is pivoted beyond said right and left lane change positions; and
   a turn signal switch operated by said lever such that a turn signal for a lane change is generated by pivoting the operating lever from said neutral position to a lane change position without moving said movable bracket and a turn signal for a right or left turn is generated by pivoting the operating lever beyond said lane change positions until the movable bracket is moved to either said right or left turn positions from said neutral position.

2. A turn signal indicating mechanism according to claim 1, further comprising a detent means for holding said movable bracket in said right and left turn and said neutral positions.

3. A turn signal indicating mechanism according to claim 2 further comprising a means for automatically returning said operating lever to said neutral position after said operating lever is pivoted from said neutral position.

4. A turn signal indicating mechanism according to claim 3 further comprising a means for automatically returning said movable bracket to said neutral position after said movable bracket has been moved to said right or left turn positions.

* * * * *